U S 0 0 6 4 1 5 8 3 7 B 1

US006415837B1

(12) United States Patent
Mäckle et al.

(10) Patent No.: US 6,415,837 B1
(45) Date of Patent: Jul. 9, 2002

(54) PNEUMATIC TIRE FOR WHEELS OF MULTIPLE-TRACK VEHICLES

(75) Inventors: Günther Mäckle, Stuttgart; Thomas Schirle, Öhringen, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/373,342

(22) Filed: Aug. 12, 1999

(30) Foreign Application Priority Data

Aug. 12, 1998 (DE) .......................... 198 36 439

(51) Int. Cl.⁷ .............................. B60C 1/00; B60C 3/06; B60C 11/01; B60C 11/14; B60C 27/00
(52) U.S. Cl. .............................. 152/209.5; 152/209.8; 152/209.14; 152/209.16; 152/210; 152/456
(58) Field of Search ................... 152/157, 158, 152/159, 208, 210, 209.5, 209.8, 209.14, 209.16, 454, 455, 456

(56) References Cited

U.S. PATENT DOCUMENTS

| 2,249,637 A | * 7/1941 | Rietz ........................... 152/454 |
| 2,281,359 A | * 4/1942 | Kenner ..................... 152/209.8 |
| 2,600,231 A | * 6/1952 | Ewart .......................... 152/454 |
| 3,142,326 A | * 7/1964 | Lindley ..................... 152/158 |
| 3,155,135 A | * 11/1964 | Klenk ..................... 152/209.8 |
| 3,162,229 A | * 12/1964 | Ellenrieder et al. ......... 152/454 |
| 3,217,776 A | * 11/1965 | Ellenrieder et al. ......... 152/210 |
| 3,286,756 A | * 11/1966 | Ellenrieder et al. ....... 152/209.8 |
| 3,630,254 A | * 12/1971 | Stadelmann ............. 152/209.8 |
| 3,974,870 A | 8/1976 | Watts |
| 3,987,831 A | * 10/1976 | Walrave et al. ............. 152/210 |
| 4,732,194 A | 3/1988 | Saneto et al. |
| 5,411,070 A | * 5/1995 | Yadegar ..................... 152/210 |
| 5,620,538 A | 4/1997 | Oshima |
| 5,634,993 A | * 6/1997 | Drreux et al. ............. 152/158 |
| 5,975,176 A | * 11/1999 | Scott ....................... 152/209.8 |

FOREIGN PATENT DOCUMENTS

| AT | 255 919 | | 7/1967 | |
| DE | 2722885 | * | 11/1978 | ................. 152/158 |
| DE | 37 20 788 | | 1/1988 | |
| DE | 37 20 706 | | 1/1989 | |
| EP | 0 607 784 | | 7/1994 | |
| EP | 0 729 826 | | 9/1996 | |
| EP | 0 820 884 | | 1/1998 | |
| FR | 796666 | * | 4/1936 | ............ 152/DIG. 6 |
| FR | 2 200 122 | | 4/1974 | |
| JP | 57-087701 | | 6/1982 | |
| JP | 61-37503 | * | 2/1986 | ............. 152/209.5 |
| JP | 63-53101 | * | 3/1988 | ................. 152/210 |
| JP | 5-139109 | | 6/1993 | |
| JP | 6-092104 | | 4/1994 | |
| JP | 7-232507 | * | 9/1995 | |
| JP | 10-151907 | * | 6/1998 | |

* cited by examiner

*Primary Examiner*—Steven D. Maki
(74) *Attorney, Agent, or Firm*—Kenyon & Kenyon

(57) ABSTRACT

A pneumatic tire for a multiple-tracked vehicle is asymmetrical and has a convex tread section that is curved radially inward and extends to a tire sidewall.

28 Claims, 3 Drawing Sheets

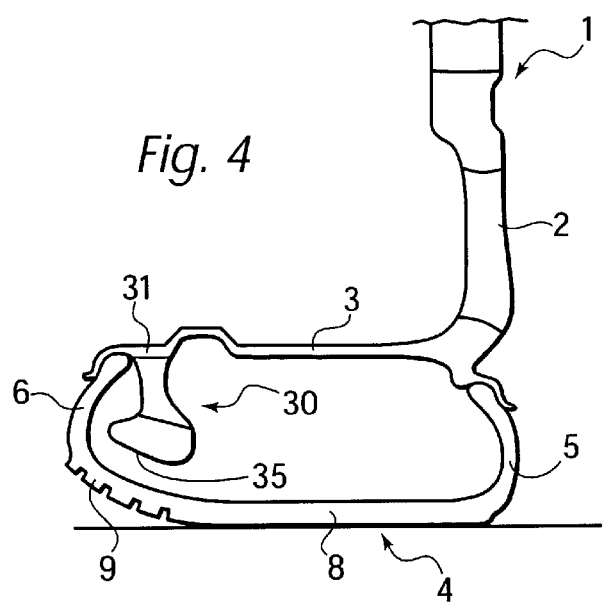
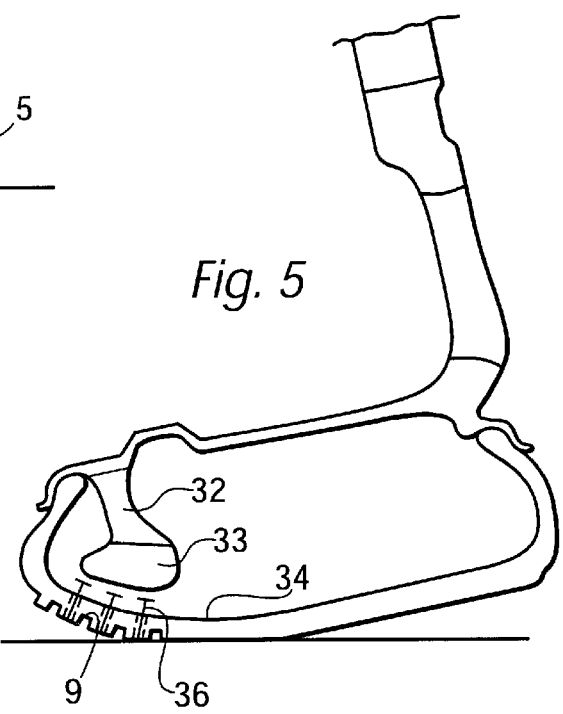
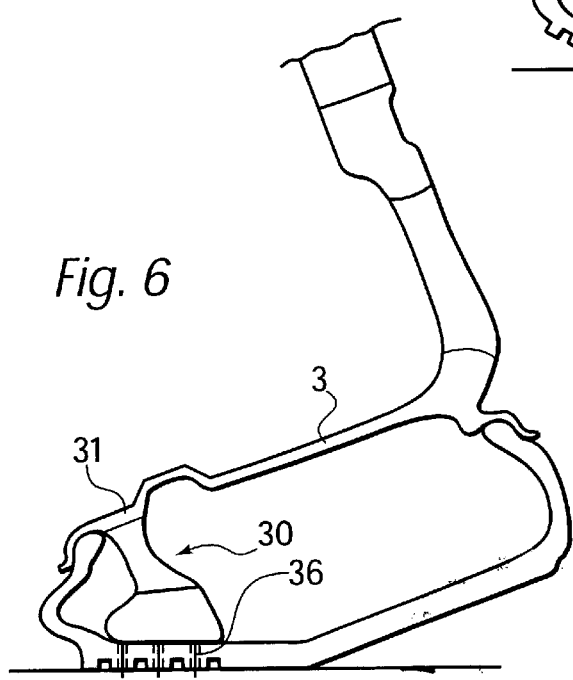
Fig. 4
Fig. 5
Fig. 6

PNEUMATIC TIRE FOR WHEELS OF MULTIPLE-TRACK VEHICLES

FIELD OF THE INVENTION

The present invention relates to a pneumatic tire for multiple-track vehicles.

RELATED TECHNOLOGY

Pneumatic tires having an asymmetrical cross section are standard equipment on multiple-track vehicles. A wide variety of tire sizes having different cross-sectional shapes regarding height-to-width ratios are used. In addition, there is a tendency to use tire cross-sectional shapes in which the height-to-width ratio (aspect ratio) is relatively small, which gives the tire a sporty look. An extreme example of this is racing car tires, which resemble rollers and have a very wide, almost flat tread. As a result, the contact area between the tire and the road is very large and, as the wheel load increases, greater longitudinal and lateral forces can be transferred.

The magnitude of the lateral forces that can be transferred is also dependent on the camber of the wheel in question and, in multiple-track wheeled vehicles, especially special-purpose vehicles known as "Kurvenleger" (three-wheeled vehicles that behave like two-wheeled vehicles when cornering), and also in production vehicles, this is utilized to good effect in that wheel suspensions are designed so that during jouncing the camber becomes negative, and combined with the increasing wheel load during cornering this results in greater transferable lateral guide forces for the wheels on the outside of the curve.

However, in conventional wheel suspensions the feasible negative camber range is very narrow, especially as, in the case of very wide sport tires, changes of this kind in the camber are undesirable in terms of the tires and are not particularly useful in terms of transferable guide forces, because, in the case of a tread with an essentially flat cross section, as the deviation from zero camber increases, the size of the contact area between the tire and the ground surface diminishes.

A pneumatic tire is described in Austrian Patent No. 255 919. The tire is asymmetrical in cross section and is designed for wheels where the camber is kept essentially constant via wheel control as part of the vehicle's basic design. The goal is to achieve better driving characteristics and tire life because the tire is rounded in the shoulder area adjacent to the outside of the tire, in conjunction with the fact that the tread pattern varies across the tire's cross section and/or the tread design varies with a view to achieving higher friction values or greater abrasion resistance. To this end, the largely flat tread section that extends to the inside of the wheel has a pronounced tread pattern for increased grip and includes abrasion-resistant tread material for high running performance in straight-line travel. By contrast, the rounded tread in the section adjacent to the outside of the wheel has a less pronounced tread pattern and includes tread material having a high friction value. This constitutes a good compromise in terms of a tire's running and driving characteristics and its wear resistance.

A tire having an asymmetrical cross section in which the surface outline extending to the outside of the wheel has a slightly reduced diameter, which, when used with a constant-camber wheel suspension designed with negative camber, results in improved running characteristics along with reduced wear, is described in European Patent Application No. 0 607 784 A1.

Furthermore, pneumatic tires for wheels of multiple-track vehicles in which the sidewalls of the tire are of different heights, the outline of the tread being essentially symmetrical and flat, and the height of the tire sidewall on the inside of the wheel being smaller than the tire wall on the outside of the wheel, and accordingly the rim on the inside of a wheel having a larger diameter than the rim on the outside of the wheel, are described in U.S. Pat. No. 3,974,870, French Patent No. 2 200 122, and European Patent Application No. 0 607 784 A1.

SUMMARY OF THE INVENTION

The object of the present invention is to provide a pneumatic tire for wheels of multiple-track vehicles which, even if the tire is fairly wide and the vehicle is cornering, allows such a large contact area between a given tire and the ground that, in combination with increased wheel load during cornering, camber-related lateral forces which are well above the lateral forces that can be transferred with zero camber can be transferred, and allows different areas of the tread to be used in response to different driving and road conditions. The present invention provides a pneumatic tire for multiple-track vehicles, in particular motor vehicles, having a tread that forms the circumference of the tire and transitions into the sidewalls of the tire via laterally adjacent tire shoulders, the sidewalls extending radially inwards to beads that are attachable to the wheel rim, the tire being asymmetrical in cross section and the tread of the tire having a nearly flat tread section which extends from one sidewall area and transitions into a narrower convex tread section that extends radially inward to the other sidewall area, characterized in that the convex tread section (9) is assigned to the inside of the wheel and in the case of a negatively cambered wheel (1) forms the load-bearing tread section (9) with respect to the road (11).

Thanks to the asymmetrical design of the tire according to the present invention, the tire can be optimized to meet the requirements of driving in a straight line and normal driving, and also can be used in combination with an active camber control system and/or a closed-loop camber control system that allows one to convert the changes in wheel load associated with cornering in the form of increases in wheel load on the wheel on the outside of the curve into corresponding lateral guide forces, and when driving in a straight line it is possible to respond to specific circumstances such as winter driving by using a different section of the tread, so that as a result driving safety, including driving safety in extreme situations, can be improved.

In an embodiment according to the present invention, the contact area between a given tread and the road for the flat tread section when driving straight can be roughly equal to that for the convex tread section during cornering. In conjunction with adjusting the camber by an amount up to about 25°, it is particularly useful to design the tire so that negative camber of about 20° in the wheels on the outside of the curve is feasible. According to this embodiment, the convex tread section facing the longitudinal middle of the vehicle is dimensioned so that in cross section the convex tread has a center plane or plane of symmetry which extends upwards and outwards at about 20° to a radial plane and intersects the radial plane located at the transition from the flat tread section to the convex section at the center of curvature, in particular of the circle of curvature of the convex tread section.

According to the present invention, it is useful if the flat tread section that faces the outside of the vehicle and wheel constitutes at least 50%, but preferably about ⅗ to ⅘, of the width of the tread, so that the width of the convex tread section constitutes ⅕ to ⅖ of the total width of the tread. Even if a variety of different widths are optimal for the uses described above, a good rule-of-thumb is to use a width ratio such that the flat tread section constitutes ⅔ and the convex tread section ⅓ of the total width of the tread.

A circular arc shape is useful for the convex tread section, and the flat tread section should transition into the convex tread section that faces the middle of the vehicle. The radius of curvature of the convex tread section is preferably greater than its width, so that the convex tread section forms a relatively flat curve and can be roughly in the shape of a parabola. The radius of curvature of the convex tread section is preferably 1.25 to 1.75 times greater than the width of that part of the tread.

The radius of curvature of the convex tread section is ⅓–½ as long as the total width of the tread.

The radius of curvature of the convex tread section is preferably greater than the height of the tire. The center of curvature preferably lies roughly within the radial plane of the tire on which the transition from the flat tread section to the convex tread section lies.

In the case of the convex tread section, the tire shoulder is preferably offset radially inwards relative to the shoulder adjacent to the flat tread section, this radial offset being about ⅙ to ⅓ of the tire height within the tire shoulder in question.

According to the present invention, the bead seats of the wheel that bears the tire can be radially offset by the same amount as the tire shoulders, so that a tire height on the inside of the wheel that is at least approximately equal to that on the outside of the wheel can be implemented.

Cambering the tire so that it runs on its convex tread section adjacent to the inside of the wheel has the consequence in terms of the forces perpendicular to the road that these forces act on the tire at the same angle as the negative camber that has been set, and thus result in a transverse force component that is high in terms of the tire's support by the rim. As the tire has to meet many different load requirements, and must meet the usual standards in terms of comfort, driving behavior and the like, there may be problems associated with absorbing such a high transverse force component in the tire structure, unless otherwise undesired changes to the tire shape are made.

In an embodiment according to the present invention, in the area of the convex tread section, a support ring may be provided which is attached to the rim that bears the tire, and in the case of a non-cambered wheel separation is maintained relative to the tire's inner surface and the support ring places limits on any undesired deformation of the tire and if necessary can be used as an additional load-bearing ring. It is particularly useful if, in the initial position, the distance between the tire and the support ring corresponds to the deformation path deemed permissible and/or the outline of the support ring that faces the tire's inner surface corresponds to the desired shape of the tire.

If the support ring is designed to be partly elastic, the elastic design being particularly feasible for the seat of the support ring facing the tire, it is useful to design its elasticity and/or deformation behavior based on the aforementioned design goals, though in the initial position it may be necessary and useful to use, between the tire's inner surface and the support ring and based on the tire's deformation behavior, embodiments and separations relative to the tire's inner surface whose arrangement in the initial position differs from that described above.

An embodiment according to the present invention, in which the convex tread section facing the inside of the wheel can be used via active camber control so that, for example, a winter tread can be used by cambering the tire during winter driving, and which also allows spikes to be arranged in the convex tread section, as this tread section is not used during normal—non-cambered wheel—driving operation and since, in view of the need to increase traction, switching over to this tread section while driving in a straight line is only an option in extreme cases. In conjunction with use of a support ring, according to the present invention one also has the option of providing retracted spikes such that the spikes are pushed into their extended work/grip position by the support ring if the wheel is cambered and the convex tread section is in contact with the support ring.

Thus there are many possible approaches to a tire according to the present invention in terms of using different tread patterns, different tread materials and the like, a particular advantage being that one can improve the vehicle's behavior during aquaplaning by cambering the wheel and using the convex tread section.

BRIEF DESCRIPTION OF THE DRAWINGS

Further details and features of the present invention are elucidated below with the help of the highly schematic diagrams of an exemplary embodiment shown in the drawings, in which:

FIG. 4 shows a section of a wheel having a tire according to the present invention in the basic wheel position for driving in a straight line and having a support ring in the convex tread section assigned to the inside of the wheel;

FIG. 5 shows the same wheel as FIG. 4 with slight negative camber and having retracted spikes in the convex tread section having a winter tread pattern; and FIG. 6 shows the same wheel as FIG. 5 with full negative camber, the convex tread section being supported by the support ring, and the spikes being pushed outward by the support ring into the grip position in the tire's ground contact area.

DETAILED DESCRIPTION

Figure 1:
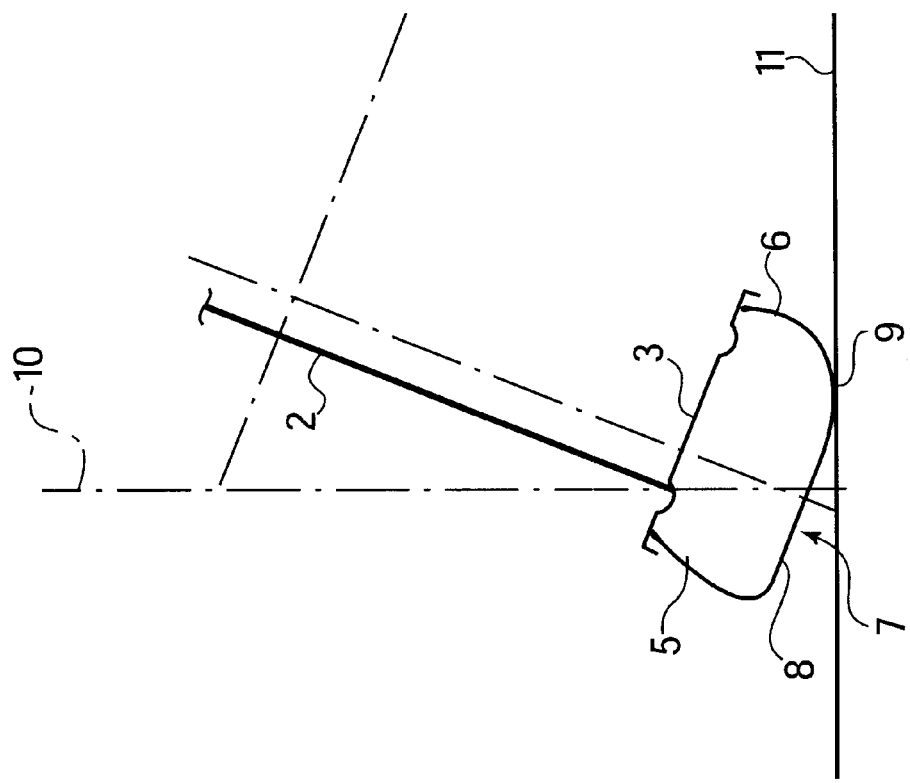
FIG. 1 shows a cross section of part of the basic structure of a pneumatically tired wheel having a tire according to the present invention, the wheel being positioned for driving in a straight line in accordance with design specifications.
Figure 2:
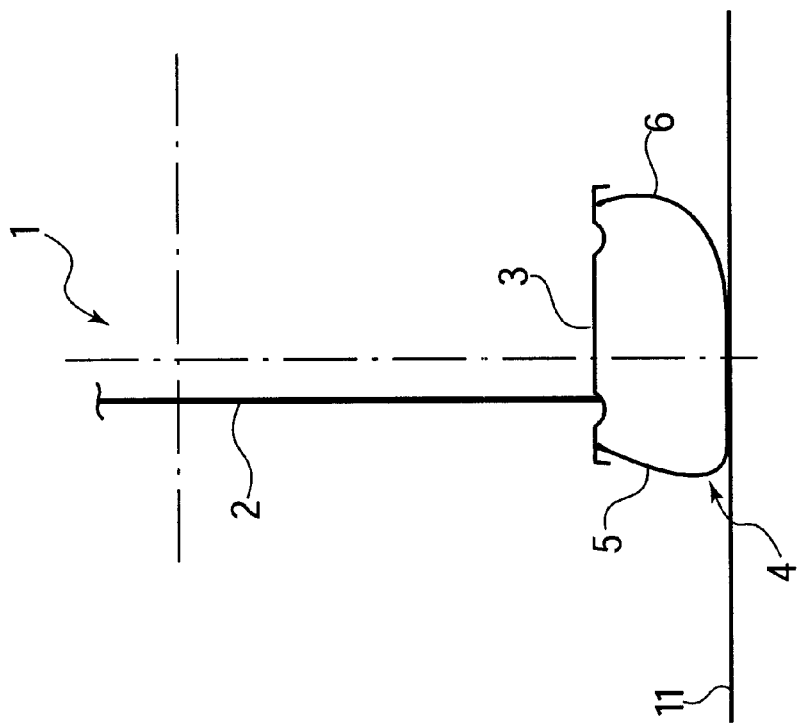
FIG. 2 shows the same wheel as FIG. 1, with pronounced negative camber.

FIGS. 1 and 2 relate to a multiple-track vehicle, preferably a vehicle in which two pneumatically tired wheels arranged opposite one another and associated with a given side of the vehicle are assigned to one axle, with a cross-sectional rear view of the left wheel with respect to the direction of driving being shown in this case. The wheel is designated 1, and its wheel disc 2; the rim surrounding the wheel disc is designated 3. Rim 3 bears tire 4 which is designed as a tubeless tire or as a pneumatic tire having a tube.

Figure 3:
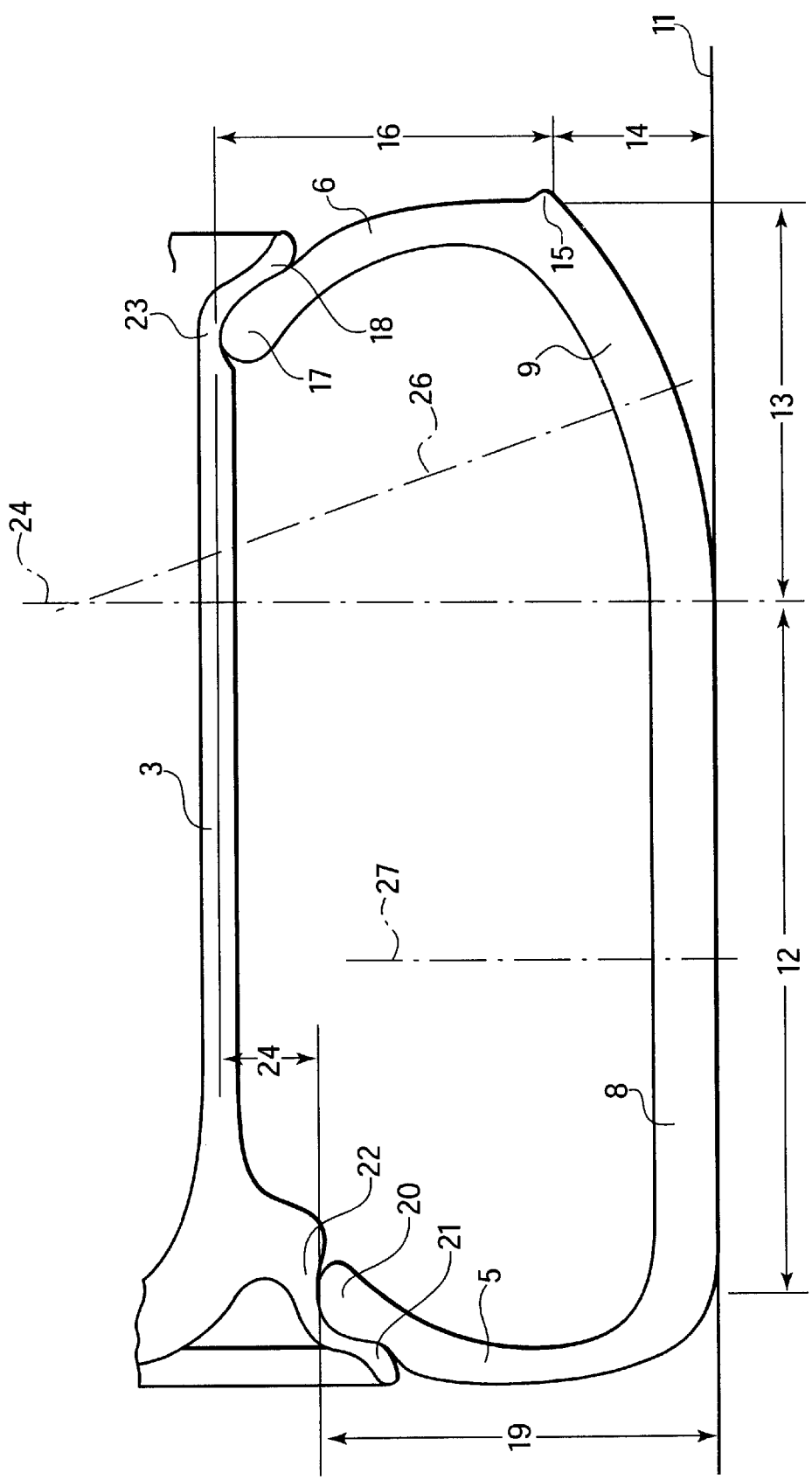
FIG. 3 is an enlarged schematic diagram showing the same area, as in FIG. 1, of a wheel that bears a tire according to the present invention.

In the arrangement shown, where wheel 1 on the vehicle bears tire 4, wheel disc 2 is offset relative to rim 3 on the outside of the wheel and vehicle; an outer sidewall forms sidewall 5 of the tire, while sidewall 6 of the tire is arranged on the inside facing the middle of the vehicle. The tread of the tire extends between outer sidewall 5 and inner sidewall 6, is designated in its entirety 7, and includes flat tread section 8, which is adjacent to outer sidewall 5, and convex tread section 9, which is adjacent to inner sidewall 6. Flat tread section 8 extends in a substantially axial direction. Sidewalls 5 and 6 may be of different height, as shown in FIG. 3, and may also have different curvatures, in other words a roughly straight line in the case of sidewall 5 and a sharper curve for shorter sidewall 6, so that for example harder or softer sidewall support can be achieved.

FIG. 1, which shows wheel 1 and tire 4, is based on the assumption that the camber of the wheel, in other words the inclination of the wheel relative to a vertical reference plane—designated 10 in FIG. 2—is at about 0° when the wheel is in a position specified in design specifications, i.e., wheel 1 is in a vertical position and rests on the road 11 via flat tread section 8. In this position, convex tread section 9 is at least essentially clear of road 11.

In FIG. 2, wheel 1 having tire 4 is inclined relative to vertical reference plane 10, i.e., it is arranged with negative camber, with a camber angle of about 20° being shown in this case. Camber angles of this kind can be implemented in vehicles in conjunction with an active camber control system and, in conjunction with the tire design according to the present invention, allow substantial lateral guide forces on the wheels on the outside of the curve. With this amount of camber, convex tread section 9 rests on road 11, the curvature being chosen according to the present invention so that the contact areas between the tread and road 11 are roughly equal in terms of given wheel contact forces. In addition, the tire is preferably designed with respect to the wheel suspension so that cambered wheel bisectors 26 and 27 of tread sections 9 and 8, respectively, and thus the wheel contact points, are in roughly the same position relative to road 11 as in the case of a non-cambered wheel, so that the relationships regarding the transfer of wheel contact forces to the wheel suspension remain roughly the same, as shown in FIG. 3 in particular.

During cornering, the wheels on the inside of the curve have a much less pronounced camber than and are subjected to much less load than the wheels on the outside of the curve, which have a pronounced negative camber.

FIG. 3 shows a schematic diagram on an enlarged scale of tire 4 and the adjoining part of the wheel formed by rim 3. Although this diagram is not to scale, it shows dimension ratios that can be used to good effect in practice.

In the exemplary embodiment, tire 4 having a tire diameter of about 650–700 mm has a flat tread section 8 having width 12 of about 160–170 mm. Convex tread section 9 having width 13 of about 100 mm is joined to this flat tread section. Assuming width 13 of convex tread section 9 is about 100 mm, as specified above, radial offset 14 of convex tread section 9 between its join to flat tread section 8 and its transition into sidewall 6 is about 40 mm, tire shoulder 15 forming the transition area between convex tread section 9 and inner sidewall 6. Radial height 16 of sidewall 6, which is supported on rim 6 via bead 17 adjacent to rim flange 18, is about 80 mm. The opposite outer sidewall 5 of tire 4 has a radial height 19 of about 100 mm and is supported on rim 3 via bead 20 adjacent to rim flange 21, bead seat 22 that bears bead 20 being offset in this exemplary embodiment relative to bead seat 23 that bears bead 17. Bead seat 23 is offset radially inwards relative to bead seat 22 based on the curvature of convex tread section 9, and the radial offset 24 between bead seats 22 and 23 is about 20 mm.

The transition from flat tread section 8 into convex tread section 9 is continuous and in FIG. 3 is shown as radial plane 24, which, in the arrangement shown, where tire 4 is supported on road 11 via flat tread section 8, is perpendicular or nearly perpendicular to road 11 according to the camber specified for the normal wheel position.

In the case of convex tread section 9 having a convex curvature, the center of curvature in the direction of the wheel axle (not shown) lies on radial plane 24, and the radius of curvature is at least equal to or greater than width 13 of convex tread section 9. In the exemplary embodiment shown, the radius of curvature is about 1.4 times greater, and as a general rule it is preferably 1.1–1.4 times greater than width 13 of convex tread section 9.

In the exemplary embodiment shown in FIG. 3, the tread area of convex tread section 9 that would be resting on road 25 if the wheel were cambered accordingly is shown via tread area bisector 26, which is at 20° to radial plane 24 and perpendicular to convex tread section 9.

In addition, in FIG. 3 the middle of flat tread section 8 in the cross section shown is indicated via radial plane 27 in which tire 4 is located when in its normal position, i.e., if the wheel is not cambered and the wheel is in the position specified in design specifications and the vehicle is traveling in a straight line. Thus is it clear from FIG. 3 that, in the exemplary embodiment according to FIG. 3, when the vehicle is cornering and the wheels on the outside of the curve have negative camber, the tire contact zone shifts into the area of convex, laterally inner tread section 9, which is then in contact with road 11, so that in the case of a cambered wheel the wheel contact point is in roughly the same position relative to road 11 as in the case of a non-cambered wheel.

In a further embodiment of the invention (not shown), a convex tread section can also be provided on the outside of the wheel in the transition between the sidewall area and the flat tread section. However, in view of the conditions on the wheel on the inside of a curve, this has a much smaller radius of curvature than the convex section provided on the inside of the wheel. According to the present invention, it may also be preferable and useful to assign different mixtures of rubber or tread patterns, tailored to the requirements in question, to individual tread sections. Thus it is preferable to assign to flat tread section 8 a rubber mixture that is relatively hard in view of high tread performance—and also because it is used a greater proportion of the time—preferably in conjunction with a tread pattern that is particularly suitable for driving in a straight line, it being possible according to the present invention to achieve extremely low rolling resistance, since according to the present invention the maximum potential transfer of force can be achieved by using the convex tread section. By contrast, a relatively soft rubber mixture that guarantees especially good contact with the road and excellent transfer of force is preferable for convex tread section 9. In addition, the tread pattern of tread section 9 should also be designed accordingly, so that this tread section can also be virtually smooth.

The choice of tread mixture and/or tread pattern results in significant differences in friction coefficients. In conjunction with the tire design according to the present invention, one can make use of these differences, so that one "tire quality" can be used for normal driving and another for extreme driving situations such as full braking. This can be achieved via active camber adjustment, not only during cornering but also, for example, when the brakes are operated. In some cases it is possible and useful to set all the wheels of the vehicle to maximum camber so that the tread is widened accordingly, so that on each wheel convex tread section 9 having the appropriate tread mixture is used. As part of camber adjustment for all the wheels of a vehicle as mentioned above, it may also be useful to equip convex tread section 9 with a winter tread pattern or spikes and, by adjusting the camber, to use this tread section in response to particular driving conditions or road conditions. Adjustments can be made automatically in conjunction with, for example, values supplied and/or processed by the vehicle's other systems. Alternatively, adjustments can be made by the driver.

FIGS. 4 to 6 show embodiments of the pneumatic tire according to the present invention having the same basic structure, and for this reason the same reference numbers have been used, and one should refer to the preceding description.

In addition, in the exemplary embodiments shown in FIGS. 4 to 6, support ring 30, which is supported by area 31 of rim 3 assigned to convex tread section 9 and faces the inside of the wheel, is assigned to convex tread section 9 located on the inside of the wheel.

Support ring 30 has an open or closed radially inner web component 32 that bears closed, radially outer ring 33, which has a contour 35 facing tire inner surface 34 that is designed so that if the wheel has negative camber and convex tread section 9 is in contact with support ring 30 the contour impresses on convex tread section 9 the desired shape for convex tread section 9, especially when it is used for driving in a straight line. The seat area that determines contour 35 may be essentially non-deformable in terms of the loads to be absorbed, or may be made of elastically deformable material, this being a preferred solution, and an elastic seat is designed so that the desired shape for the wheel's ground contact area is determined based on the desired pressure distribution in view of the loads. In an embodiment of the present invention, the seat can also be arranged on the tire's inner surface, and if necessary can also be divided up between the support ring and the tire.

In an embodiment of the present invention, in reference to the basic position of wheel 1 shown in FIG. 4 it is preferable to ensure that separation is maintained between contour 35 of support ring 30 and inner surface 34 of tire 4, to ensure clearance between tire 4 and support ring 30.

FIG. 5 shows that in a further embodiment convex tread section 9 can have a winter tread pattern, and that it may be useful to arrange spikes 36 or other traction aids on this tread section, in particular in the case of a winter tread pattern but also in the case of other tread patterns, and these spikes 36 are preferably retracted as shown in FIG. 5.

If wheel 1 is cambered further as shown in FIG. 6, and if convex tread section 9 comes completely into contact with the road, support ring 30 also forms a support for the elements provided as traction aids, in particular spikes 36, and pushes them into an extended, working position.

According to embodiments of the present invention, one can thus make available a pneumatic tire 4 with many possible variations, including in terms of specific driving situations, which is thus suitable for a wide variety of driving conditions and uses.

What is claimed is:

1. A pneumatic tire for a wheel of a multiple-track vehicle, the tire comprising:
   a first sidewall and a second sidewall, the first sidewall extending in a radially inward direction to a first bead attachable to a rim of the wheel and the second sidewall extending in the radially inward direction to a second bead attachable to the rim;
   a tread forming a circumference of the tire and transitioning into the first and second sidewalls via laterally adjacent tire shoulders, the tread including:
      a convex tread section extending in the radially inward direction to an area of the first sidewall, the convex tread section for use at an inside area of the wheel and forming a load-bearing tread section with respect to a road when the wheel is negatively cambered; and
      a flat tread section extending in a substantially axial direction from an area of the second sidewall and transitioning into the convex tread section, the flat tread section being wider than the convex tread section;
   the tire being asymmetrical in cross section.

2. The pneumatic tire as recited in claim 1 wherein the convex tread section forms the load-bearing tread section when the wheel has a negative camber of about 20°.

3. The pneumatic tire as recited in claim 1 wherein the approximately flat tread section forms about ⅗ to ⅘ of a width of the tread and the convex tread section forms about ⅕ to ⅖ thereof.

4. The pneumatic tire as recited in claim 3 wherein the approximately flat tread section forms about ⅔ of the tread and the convex tread section forms about ⅓ thereof.

5. The pneumatic tire as recited in claim 1 wherein the convex tread section is substantially curved in a circular arc shape.

6. The pneumatic tire as recited in claim 5 wherein the convex tread section includes a radius of curvature greater than a width of the convex tread section.

7. The pneumatic tire as recited in claim 6 wherein the radius of curvature is 1.25 to 1.75 times greater than the width of the convex tread section.

8. The pneumatic tire as recited in claim 7 wherein the radius of curvature is 1.5 times greater than the width of the convex tread section.

9. The pneumatic tire as recited in claim 7 wherein the radius of curvature is about ⅓ to ½ times a total width of the tread.

10. The pneumatic tire as recited in claim 1 wherein a radius of curvature of the convex tread section is greater than a height of the tire.

11. The pneumatic tire as recited in claim 1 wherein a center of curvature of the convex tread section lies within a radial plane extending through an area of the transitioning from the approximately flat tread section to the convex tread section.

12. The pneumatic tire as recited in claim 1 wherein the first bead is offset in the radially inward direction relative to the second bead.

13. The pneumatic tire as recited in claim 12 wherein the offset is about ⅙ to 1/12 of a width of the tire.

14. The pneumatic tire as recited in claim 12 wherein the offset is about ⅙ to ⅓ of a height of the tire measured above a seat of the at least one of the first and second beads.

15. The pneumatic tire as recited in claim 1 wherein the wheel includes first and second bead seats offset in a radial direction.

16. The pneumatic tire as recited in claim 15 wherein the first and second beads are offset in the radial direction by a same amount as the offset of the first and second bead seats in the radial direction.

17. The pneumatic tire as recited in claim 1 wherein the convex tread section includes a winter tread pattern.

18. The pneumatic tire as recited in claim 1 wherein the convex tread section includes spikes disposed thereon.

19. The pneumatic tire as recited in claim 1 wherein the convex tread section includes a first rubber mixture and the flat tread section includes a second rubber mixture.

20. The pneumatic tire as recited in claim 19 wherein the first rubber mixture includes a relatively soft rubber mixture and the second rubber mixture includes a relatively hard rubber mixture.

21. The pneumatic tire as recited in claim 1 wherein the convex tread section includes a first tread pattern and the flat tread section includes a second tread pattern.

22. A pneumatic tire system for a multiple-track vehicle, the tire system comprising:
a wheel including a tire and a rim, the tire including:
a first sidewall and a second sidewall, the first sidewall extending in a radially inward direction to a first bead attachable to a rim of the wheel and the second sidewall extending in the radially inward direction to a second bead attachable to the rim;
a tread forming a circumference of the tire and transitioning into the first and second sidewalls via laterally adjacent tire shoulders, the tread including:
a convex tread section extending in the radially inward direction to an area of the first sidewall, the convex tread section for use at an inside area of the wheel and forming a load-bearing tread section with respect to a road when the wheel is negatively cambered; and
an approximately flat tread section extending in a substantially axial direction from an area of the second sidewall and transitioning into the convex tread section, the approximately flat tread section being wider than the convex tread section; and
a support ring attached to the rim and located completely within an area of the convex tread section, the support ring being disposed a distance from an inner surface of the tire when the wheel is non-cambered;
the tire being asymmetrical in cross section.

23. The pneumatic tire as recited in claim 22 wherein, when the wheel is non-cambered, a distance between the inner surface of the tire and a surface of the support ring facing the inner surface of the tire roughly corresponds to a deformation path of the tire within the convex tread section arising in the ground contact area of the tire when the wheel is cambered.

24. The pneumatic tire as recited in claim 22 wherein the support ring is at least partly elastic.

25. The pneumatic tire as recited in claim 22 wherein the support ring includes an elastic seat adjacent to the inner surface of the tire.

26. The pneumatic tire as recited in claim 22 wherein the convex tread section includes a winter tread pattern.

27. The pneumatic tire as recited in claim 22 wherein the convex tread section includes spikes disposed thereon.

28. A pneumatic tire system for a multiple-track vehicle, the tire system comprising:
a wheel including a tire and a rim, the tire including:
a first sidewall and a second sidewall, the first sidewall extending in a radially inward direction to a first bead attachable to a rim of the wheel and the second sidewall extending in the radially inward direction to a second bead attachable to the rim;
a tread forming a circumference of the tire and transitioning into the first and second sidewalls via laterally adjacent tire shoulders, the tread including:
a convex tread section extending in the radially inward direction to an area of the first sidewall, the convex tread section for use at an inside area of the wheel and forming a load-bearing tread section with respect to a road when the wheel is negatively cambered; and
an approximately flat tread section extending from an area of the second sidewall and transitioning into the convex tread section, the approximately flat tread section being wider than the convex tread section; and
a support ring attached to the rim and located within an area of the convex tread section, the support ring being disposed a distance from an inner surface of the tire when the wheel is non-cambered;
the tire being asymmetrical in cross section;
wherein the convex tread section includes spikes disposed thereon;
wherein the spikes are capable of assuming an inoperative position and an operative position, the spikes being retracted with respect to an outer surface of the convex tread section in the inoperative position, the spikes being pushed into the operative position by the support ring when the wheel is cambered such that a wall of the tire presses against the support ring.

* * * * *